United States Patent
Kwatra et al.

(10) Patent No.: US 11,847,650 B2
(45) Date of Patent: Dec. 19, 2023

(54) METHODS AND SYSTEMS FOR MANAGING PERSONAL DEVICE SECURITY

(71) Applicant: INTERNATIONAL BUSINESS MACHINES CORPORATION, Armonk, NY (US)

(72) Inventors: Shikhar Kwatra, Durham, NC (US); Florian Pinel, New York, NY (US); Paul Krystek, Highland, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 16/054,751

(22) Filed: Aug. 3, 2018

(65) Prior Publication Data
US 2020/0043010 A1   Feb. 6, 2020

(51) Int. Cl.
*G06Q 20/40* (2012.01)
*G06Q 20/34* (2012.01)
*G06Q 20/36* (2012.01)

(52) U.S. Cl.
CPC ..... *G06Q 20/40145* (2013.01); *G06Q 20/341* (2013.01); *G06Q 20/3674* (2013.01)

(58) Field of Classification Search
None
See application file for complete search history.

(56) References Cited

U.S. PATENT DOCUMENTS

| | | | |
|---|---|---|---|
| 5,613,012 A | 3/1997 | Hoffman et al. | |
| 5,625,669 A | 4/1997 | McGregor et al. | |
| 6,811,082 B2 * | 11/2004 | Wong | G06K 7/10336 235/492 |
| 8,370,265 B2 * | 2/2013 | Coulter | G06Q 20/108 380/247 |
| 9,715,681 B2 | 7/2017 | Hammad | |
| 9,785,930 B1 * | 10/2017 | Terra | G06Q 20/102 |
| 10,453,041 B1 * | 10/2019 | Walker | G06Q 20/321 |
| 2002/0066042 A1 * | 5/2002 | Matsumoto | G06Q 20/341 726/7 |

(Continued)

FOREIGN PATENT DOCUMENTS

| | | | |
|---|---|---|---|
| WO | WO-2016053605 A1 * | 4/2016 | G06Q 20/341 |
| WO | 2016197191 A1 | 12/2016 | |

OTHER PUBLICATIONS

Radu, Cristian. Implementing Electronic Card Payment Systems, Artech House, 2002. ProQuest Ebook Central, Chapter 2 Payment Card Processing, pp. 9-50 http://ebookcentral.proquest.com/lib/uspto-ebooks/detail.action?docID=227605 (Year: 2002).*

(Continued)

*Primary Examiner* — Jacob C. Coppola
*Assistant Examiner* — Eduardo Castilho
(74) *Attorney, Agent, or Firm* — Griffiths & Seaton PLLC

(57) ABSTRACT

Embodiments for managing personal device security by one or more processors are described. Information associated with activity of a personal device is received. The information is detected utilizing a sensor coupled to the personal device. A signal representative of the received information is generated. An operational state of the personal device is caused to be changed after the generating of the signal.

18 Claims, 7 Drawing Sheets

(56) References Cited

U.S. PATENT DOCUMENTS

| | | | | |
|---|---|---|---|---|
| 2003/0220876 | A1* | 11/2003 | Burger | G06Q 20/4097 705/50 |
| 2004/0022542 | A1* | 2/2004 | Atkinson | G11B 23/281 398/115 |
| 2004/0236819 | A1* | 11/2004 | Anati | G06Q 20/12 709/200 |
| 2006/0193503 | A1* | 8/2006 | Bauchspies | G06V 40/10 382/124 |
| 2006/0236302 | A1* | 10/2006 | Bateman | G06F 8/34 717/104 |
| 2007/0198436 | A1* | 8/2007 | Weiss | G06Q 20/3821 705/75 |
| 2008/0126260 | A1* | 5/2008 | Cox | G06Q 20/20 705/67 |
| 2008/0148059 | A1* | 6/2008 | Shapiro | G06F 21/32 713/186 |
| 2010/0155470 | A1* | 6/2010 | Woronec | G06Q 20/354 235/380 |
| 2010/0250435 | A1* | 9/2010 | Pedersen | G06Q 20/341 273/148 A |
| 2011/0140841 | A1* | 6/2011 | Bona | G06Q 20/352 340/5.83 |
| 2011/0206285 | A1* | 8/2011 | Hodge | G06F 21/84 382/224 |
| 2012/0074232 | A1* | 3/2012 | Spodak | G06Q 20/363 235/492 |
| 2012/0191612 | A1* | 7/2012 | Spodak | G06Q 20/347 705/65 |
| 2012/0254037 | A1* | 10/2012 | Mullen | G06Q 20/3552 705/44 |
| 2013/0086389 | A1* | 4/2013 | Suwald | G06Q 20/341 713/185 |
| 2013/0191279 | A1* | 7/2013 | Calman | G06Q 20/354 705/41 |
| 2014/0081785 | A1* | 3/2014 | Valadas Preto | G06Q 20/341 705/21 |
| 2014/0108172 | A1 | 4/2014 | Weber et al. | |
| 2015/0039454 | A1 | 2/2015 | Giera et al. | |
| 2015/0073983 | A1* | 3/2015 | Bartenstein | G06Q 20/325 705/41 |
| 2015/0074615 | A1* | 3/2015 | Han | G06F 21/31 715/863 |
| 2015/0113666 | A1* | 4/2015 | Buck | G06F 21/50 726/28 |
| 2015/0348029 | A1* | 12/2015 | Van Os | G06Q 20/405 705/44 |
| 2016/0110716 | A1* | 4/2016 | Sharifi Mehr | G06Q 20/3567 705/75 |
| 2016/0267486 | A1* | 9/2016 | Mitra | G06Q 20/3572 |
| 2017/0195339 | A1* | 7/2017 | Brown | G06F 21/34 |
| 2018/0082068 | A1* | 3/2018 | Lancioni | G06F 21/84 |
| 2018/0089689 | A1 | 3/2018 | Shaw | |
| 2018/0130033 | A1 | 5/2018 | Aaron et al. | |
| 2018/0181737 | A1* | 6/2018 | Tussy | G06F 21/32 |
| 2018/0181958 | A1* | 6/2018 | Locke | G06Q 20/34 |
| 2018/0219992 | A1* | 8/2018 | Iasso | G06K 9/22 |
| 2019/0080189 | A1* | 3/2019 | Van Os | G06F 21/32 |
| 2019/0122214 | A1* | 4/2019 | Chau | G06Q 20/34 |
| 2019/0259034 | A1* | 8/2019 | Frank | G06Q 20/405 |
| 2020/0327458 | A1* | 10/2020 | Dutt | G06Q 20/327 |

OTHER PUBLICATIONS

Ranjan, "Tokenization of a physical debit or credit card for payment,",2017, https://ip.com/IPCOM/000251283 (Year: 2017).*

A. Noore, "Highly robust biometric smart card design," in IEEE Transactions on Consumer Electronics, vol. 46, No. 4, pp. 1059-1063 , Nov. 2000, doi: 10.1109/30.920462. (Year: 2000).*

M. Salajegheh, B. Priyantha and J. Liu, "Unleashing the Wild Card for mobile payment," 2014 IEEE International Conference on Pervasive Computing and Communications (PerCom), 2014, pp. 121-129, doi: 10.1109/PerCom.2014.6813952. (Year: 2014).*

H. Vats, R. Ruhl and S. Aghili, "Fingerprint security for protecting EMV payment cards," 2015 10th International Conference for Internet Technology and Secured Transactions (ICITST), 2015, pp. 95-101, doi: 10.1109/ICITST.2015.7412065. (Year: 2015).*

R. Tamezheneal and S. Sumathi, "Implementation of biometrie smart card using multibiometrics," 2017 International Conference on Trends in Electronics and Informatics (ICEI), 2017, pp. 777-782, doi: 10.1109/ICOEI.2017.8300810. (Year: 2017).*

R. Sanchez-Reillo, R. Blanco-Gonzalo, J. Liu-Jimenez, M. Lopez and E. Canto, "Universal access through biometrics in mobile scenarios," 2013 47th International Carnahan Conference on Security Technology (ICCST), 2013, pp. 1-6, doi: 10.1109/CCST.2013. 6922051. (Year: 2013).*

\* cited by examiner

METHODS AND SYSTEMS FOR MANAGING PERSONAL DEVICE SECURITY

BACKGROUND OF THE INVENTION

Field of the Invention

The present invention relates in general to computing systems, and more particularly, to various embodiments for managing the security of personal devices.

Description of the Related Art

With increasing interconnectivity, security related to personal devices, such as magnetic stripe cards (e.g., payment cards, identification cards, etc.), electronic/computing devices (e.g., phones, tablets, fobs, etc.), and various types of appliances (e.g., computing appliances, home appliances, etc.), is an ever-growing concern. For example, payment card (e.g., credit/debit card, gift card, etc.) fraud already poses a significant problem. Although the subject typically focuses on online transactions (e.g., "hacking"), a significant portion of fraudulent transactions are performed "in person." That is, often the fraudulent transactions are performed by an individual at a physical location (e.g., in a store, at a restaurant, etc.) with a payment card that rightfully belongs to another. Often, the transaction itself is performed by another person, such as when the payment card is handed to a sales clerk or server, who then "runs" the card.

Although payment card "chips" are becoming increasingly used to enable encrypted transactions, the implementation of such systems is often too expensive for some organizations, especially small businesses. As such, the "swiping" and manual "running" of payment cards is likely to continue for some time, particularly given the recent availability of various mobile, portable payment card readers.

SUMMARY OF THE INVENTION

Various embodiments for managing personal device security by one or more processors are described. In one embodiment, by way of example only, a method for managing personal device security, again by one or more processors, is provided. Information associated with activity of a personal device is received. The information is detected utilizing a sensor coupled to the personal device. A signal representative of the received information is generated. An operational state of the personal device is caused to be changed after the generating of the signal.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
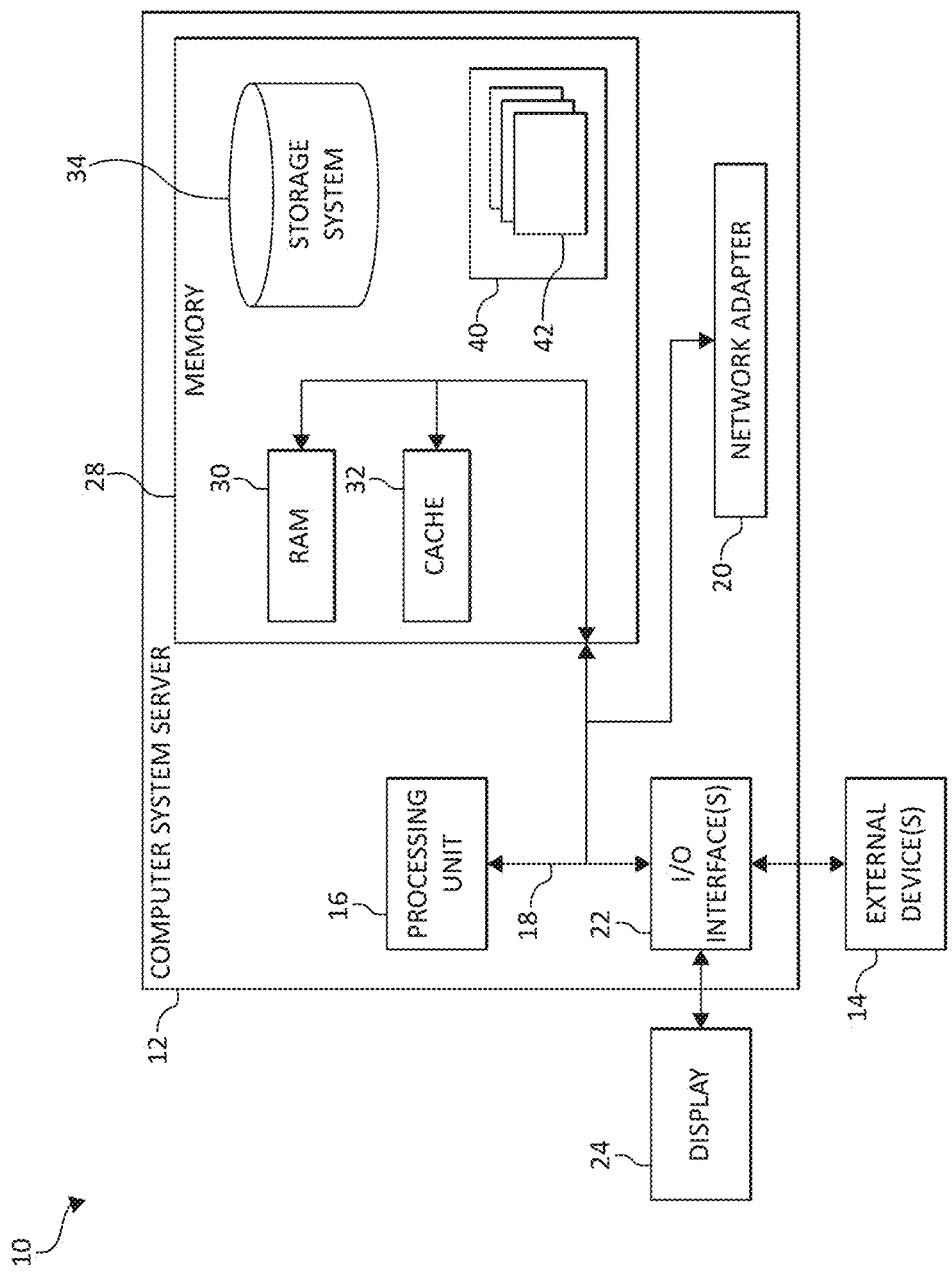
FIG. 1 is a block diagram depicting an exemplary computing node according to an embodiment of the present invention.

As discussed above, with increasing interconnectivity, security related to personal devices, such as magnetic stripe cards (e.g., payment cards, identification cards, etc.), computing systems, mobile electronic devices (e.g., phones, tablets, fobs, etc.), and various types of appliances (e.g., computing appliances, home appliances, etc.), is an ever-growing concern.

For example, payment card (e.g., credit/debit card, gift card, etc.) fraud is an ever-increasing problem. Although discussions on the topic typically focus on online transactions (e.g., "hacking"), a significant portion of fraudulent transactions are performed by individuals at physical locations (e.g., "in person"), such as at stores, restaurants, etc., with payment cards that belong to other people (e.g., stolen payment cards). Often, the transaction itself is performed by another person, such as when the payment card is handed to a sales clerk or waiter, who then "runs" the card or manually "runs" the card by inputting the card number, expiration date, etc.

Although payment card "chips" are becoming increasingly used to enable encrypted transactions, the implementation of such systems is often too expensive for some organizations, especially small businesses. As such, the "swiping" and manual entry of payment cards, along with the manual entry of payment card information, is likely to continue for some time, particularly given the recent availability of various mobile, portable payment card readers. Thus, there is a need to improve the security of payment card transactions which use, for example, swiping, manual entry, etc. as many transactions will be performed using such technology for years to come.

However, similar problems arise with other types of devices with which owners/users thereof have security concerns, such as other types of magnetic stripe cards (e.g., identification cards, library cards, etc.), various types of computing devices, such as mobile devices (e.g., fobs, mobile phones, tablets, etc.), and appliances, such a computing appliances (e.g., storage devices, such as external hard drives). As such, it should be understood that as described herein, "personal device(s)" may refer to any sort of device which has a potential security concern (e.g., related to fraud, identify theft, unauthorized/undesired use, etc.), such as the various devices described above.

To address these needs, some embodiments described herein provide methods and systems for managing personal device security, such as related to magnetic stripe cards (e.g., payment cards, identification cards, etc.). For example, in some embodiments, the methods/systems may be used to manage payment card (e.g., credit card, debit card, etc.) security, utilizing, for example, a "smart payment card." The smart payment card may be formed by, for example, payment card security device (or attachment) coupled to an otherwise conventional payment card or the functionality of such security devices (as described below) being integrated into (e.g., embedded within) payment cards (or other personal device). The embodiments described herein may allow for improved payment card security while using much of the current infrastructure used for payment card transactions (e.g., current payment cards, card readers, etc.).

For example, in some embodiments, the methods and systems described herein utilize a security device that is coupled (or attached) to the exterior of a payment card (e.g., credit or debit card). The security device may be an electronic or computing device (e.g., essentially a mobile electronic device, wearable technology device, etc.) that is configured to perform one or more various functions, such as scan fingerprints, capture images, hide/show portions of the payment card, detect if the card is swiped (and/or if the payment card chip is read), and detect if a photo is taken of the payment card. However, it should again be noted that similar security devices may be attached to (and/or integrated within) other types of personal devices, such as other types of data storage cards (e.g., those with chips or RFID technology), computing devices, fobs (e.g., key fobs), and appliances.

In some embodiments, the security device is configured to send the collected information (e.g., images, fingerprint scan, etc.) to another computing device, such as a mobile phone, tablet, "smart" wallet, etc. and/or a centralized server (e.g., in the cloud). The information may be, for example, compared to stored information associated with the owner of the personal device (e.g., a photograph of the owner, the owner's fingerprints, etc.) or another authorized user. Based on the comparison, the operational state of the personal device may be changed. For example, if a fingerprint scanned by the security device does not match that of the owner, the security device may (continue or begin to) hide information on the personal device, the personal device may otherwise rendered inoperative, and/or an account associated with the personal device may be "frozen" or "locked" so that the card may not be used in any transactions (e.g., in the case of a payment card).

As another example, a notification may be provided to the owner of the personal device via, for example, a(nother) computing device (e.g., a text message, email, etc.), who may then provide an indication of whether or not the personal device should be allowed to be used. For example, if the security device captures an image of an individual (e.g., one attempting to use the personal device), the image may be sent to the owner. The owner may then manually provide a response (e.g., via a software application) that affects the operational state of the personal device (e.g., via the security device) and/or an account associated therewith.

In some embodiments, such as in the case of payment cards, data from multiple security devices (and/or payment cards) is aggregated to determine, for example, how often security threat incidents are occurring at particular locations, determine whether or not fraudulent activity is taking place, affect the operational state of the card(s), notify the owners' of the cards, etc. Such analysis and/or actions may be taken using a cognitive system and/or cognitive analysis.

As such, in some embodiments, the methods and/or systems described herein may utilize a "cognitive system," "cognitive analysis," "cognitive modeling," "machine learning," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of personal device security. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method, by one or more processors, for managing personal device security is provided. Information associated with activity of a personal device is received. The information is detected utilizing a sensor coupled to the personal device. A signal representative of the received information is generated. An operational state of the personal device is caused to be changed after the generating of the signal.

The personal device may include a magnetic stripe card, a fob, or an appliance. The sensor may be attached to the exterior of the personal device. The sensor may include at least one of a camera and a fingerprint scanner.

The personal device may include a magnetic stripe card, the sensor may include a camera, and the received information may include an image of an individual associated with the activity of the magnetic stripe card captured by the camera. The personal device may include a magnetic stripe card, the sensor may include a fingerprint scanner, and the received information may include a fingerprint scan of an individual associated with the activity of the magnetic stripe card detected by the fingerprint scanner.

The generating of the signal may include comparing the received information to stored information associated with an authorized user of the personal device. The causing of the operational state of the personal device to be changed may be based on said comparison.

The generating of the signal may include providing a notification to an owner of the personal device. An indication from the owner of the personal device in response to the notification may be received. The causing of the operational state of the personal device to be changed may be based on the received indication.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal devices and/or security devices associated therewith (as described herein), personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
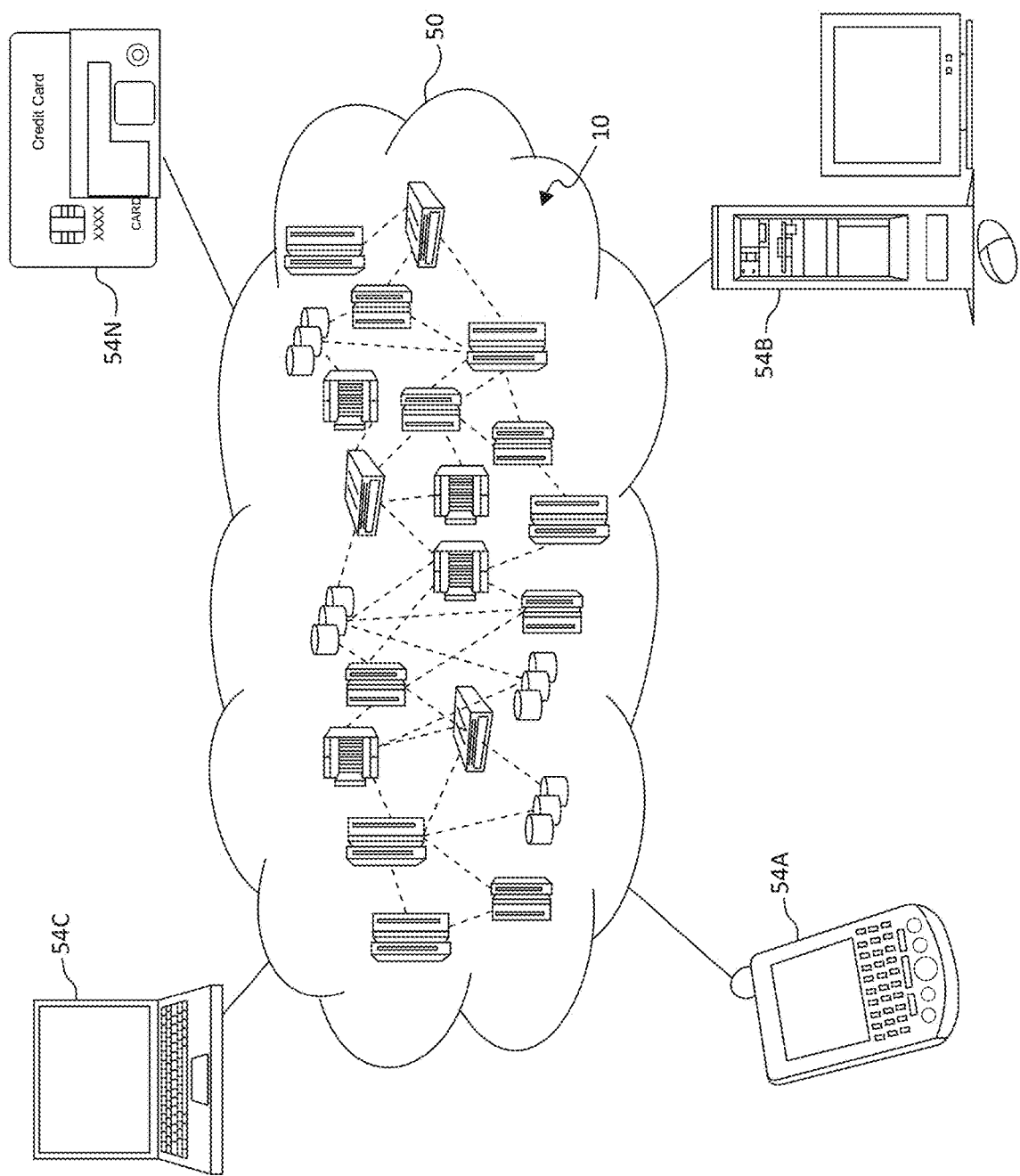
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, and personal device (e.g., a smart payment card, key fob, etc.) 54N (as described below) may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
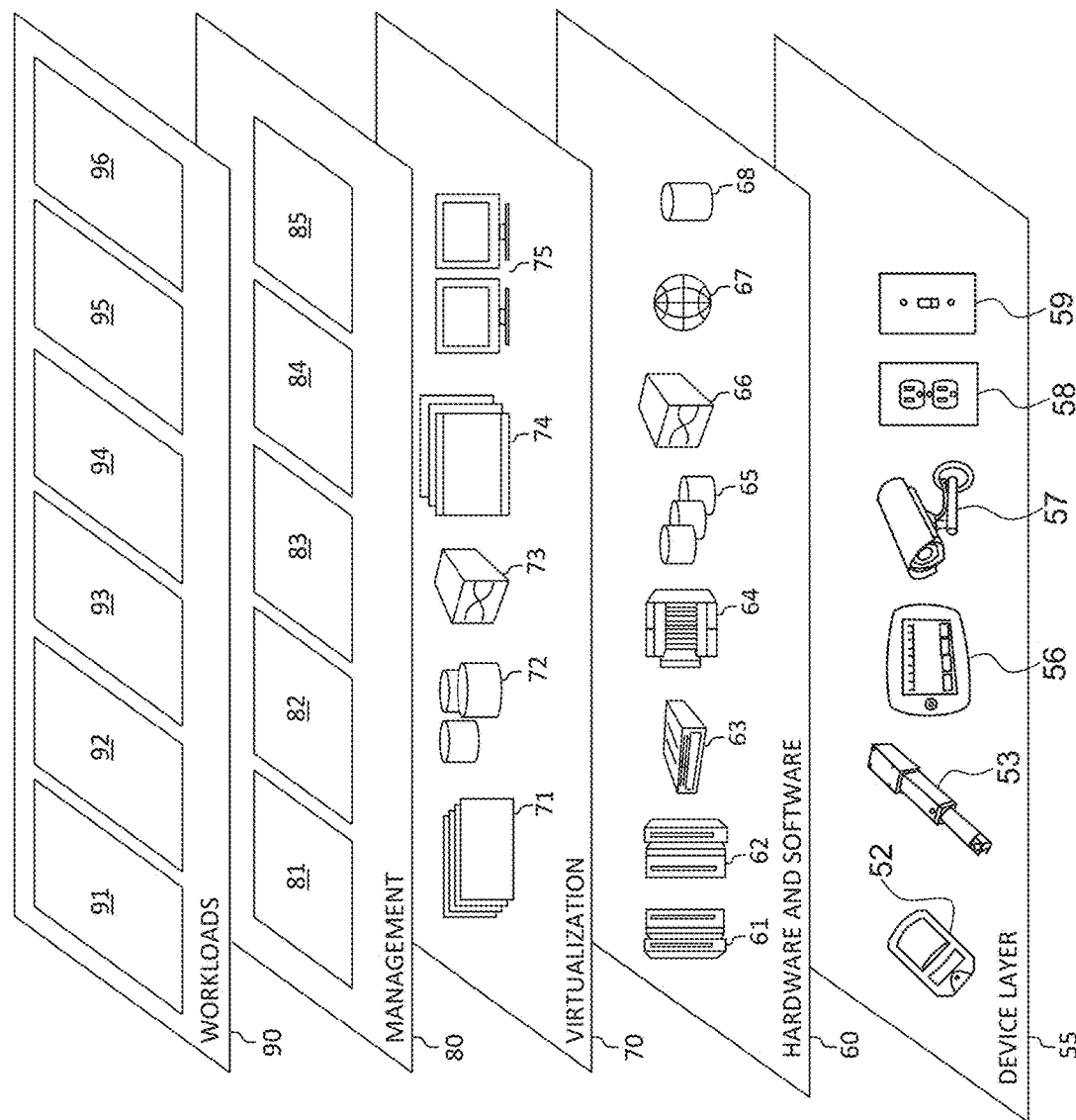
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various types of personal devices (e.g., magnetic stripe cards), various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices (e.g., external hard drives) 65; networks and networking components 66; and other types of computing appliances. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing personal device security as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, methods and systems for managing personal device (e.g., magnetic stripe card) security are provided. For example, in some embodiments, a security device is coupled (or attached) to the exterior of a personal device. As one example, the personal device may be a magnetic stripe card, such as a payment card (e.g., credit card, debit card, etc.). The security device may be an electronic or computing device (e.g., essentially a mobile electronic device, wearable technology device, etc.) that is configured to perform one or more various functions, such as scan fingerprints, capture images, hide/show portions of the payment card, detect if the card is swiped (and/or if the payment card chip is read), and detect if a photo is taken of the payment card. The security device may be configured to send the collected information (e.g., images, fingerprint scan, etc.) to another computing device, such as a mobile phone, tablet, "smart" wallet, etc. and/or a centralized server (e.g., in the cloud). The information may be, for example, compared to stored information associated with the owner of the payment card (e.g., a photograph of the owner, the owner's fingerprints, etc.). Based on the comparison, or a indication provided by the owner of the card, the operational state of the payment card may be changed.

In other embodiments, the methods and systems described herein may be applied to other types of personal devices, such as other types of magnetic stripe cards (e.g., identification cards, library cards, etc.), various types of computing devices, such as mobile devices (e.g., fobs, mobile phones, tablets, etc.), and appliances, such a computing appliances (e.g., external hard drives). In such embodiments, the security devices utilized may be appropriate sized and shaped to be coupled to the respective personal device and configured to perform the various methods and functionality described herein (e.g., change the operational state of the respective personal device in certain circumstances).

Figure 4:
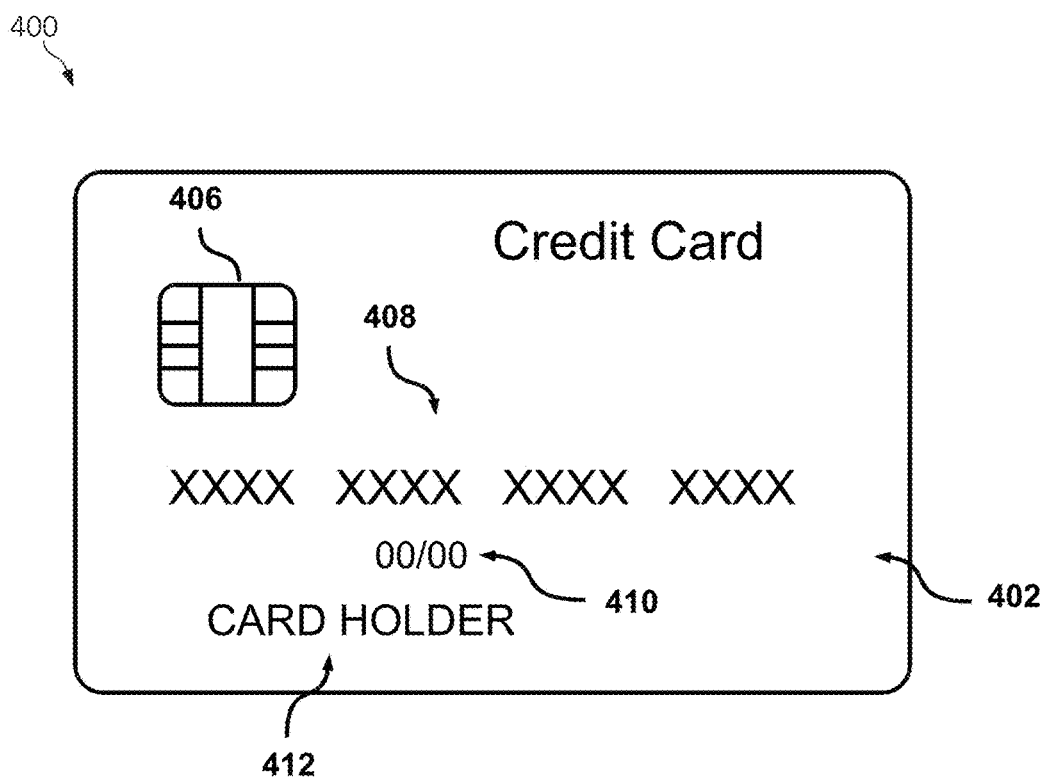
FIG. 4 is a plan view of a front of a personal device according to an embodiment of the present invention.
Figure 5:
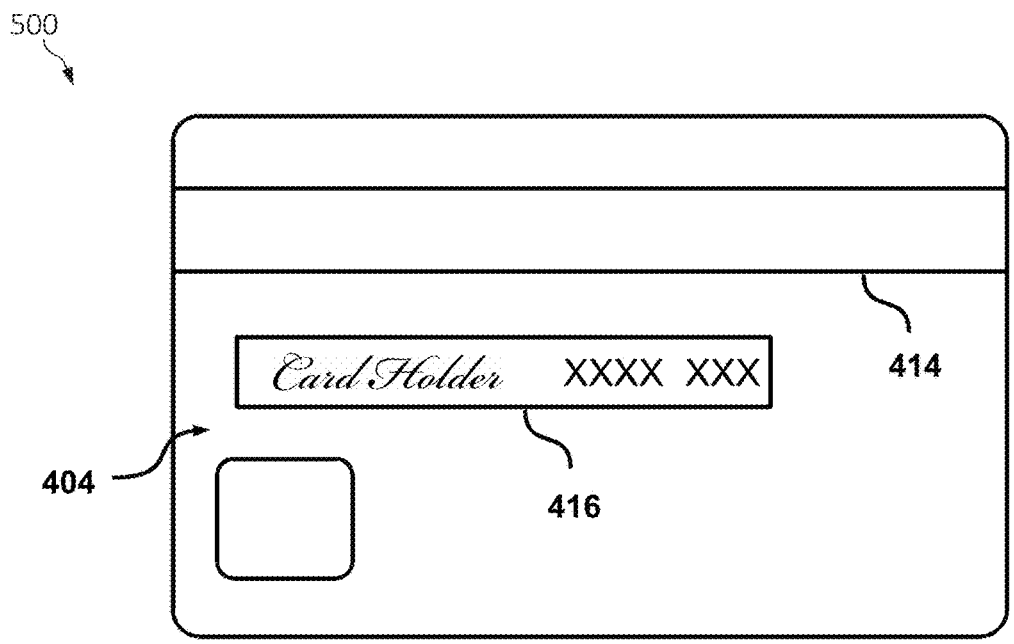
FIG. 5 is a plan view of a back of the personal device of FIG. 4.

FIGS. 4 and 5 illustrate an exemplary personal device. In the depicted embodiment, the personal device is a magnetic stripe card, or more particularly, a payment card 400. FIGS. 4 and 5 respectively illustrate a front (side) 402 and a back (side) 404 of the payment card 400. In the depicted embodiment, the card 400 is substantially rectangular in shape with, for example, a length of about 86 millimeters (mm), a width of about 54 mm, and a thickness of about 0.76 mm, and may be substantially made of any suitable material, such a plastic or polymer, ceramic, metal, paper, etc. In other embodiments, the card 400 may be in different shapes (e.g., square, circular, etc.) and sizes. In some embodiments, the card 400 is a credit card (as indicated in FIG. 4). However, it should be understood that the methods and systems described herein may be applied to other types of payment cards, such as debit cards, ATM cards, "gift" cards, "store-valued" cards, etc., or any type of payment card associated with, for example, a financial institution and/or any type of account.

Referring specifically to FIG. 4, in the depicted embodiment, visible on the front 402 of the card 400 are a card "chip" 406, a card (or account) number 408 (e.g., shown as "XXXX XXXX XXXX XXXX"), an expiration date 410 (e.g., shown as "00/00"), and a name 412 associated with the card or account or of the owner of the card (e.g., shown as "Card Holder"). As will be appreciated by one skilled in the art, the card chip 406 may be at least partially embedded into the material of the card 400 and include, for example, an integrated circuit that may provide functionality with respect to person identification, authentication, data storage, and/or application processing, as is commonly understood in the art. The card number 408, the expiration date 410, and name 412 may be formed using, for example, raised (or lowered) lettering/numbers (or alphanumeric characters) formed in the material of the card 400. However, in some embodiments, such information (e.g., the card number 408) may be displayed by a display device or screen integrated into the card 400.

Referring now to FIG. 5, on the back 404 of the card 400 are, for example, a magnetic stripe (or strip) 414 and a signature strip 416. As will be appreciated by one skilled in the art, the magnetic stripe 414 may include a band of magnetic material with magnetic particles deposited thereon. The signature strip 416 may be coated with a suitable material for holding ink (e.g., a signature written with a pen) and may also show information related to the card 400 and/or an account associated therewith (e.g., a portion of the account number, a security/verification code, etc.).

In some embodiments, the various components of the card 400, such as the card number 408, name 412, and signature strip 416 are sized and positioned on the card 400 in such a way to ensure compatibility/functionality with the payment card security device(s) described herein. Additionally, it should be noted that in some embodiments, at least some aspects of payment card security described herein may be integrated into the card 400 itself (as opposed to the payment card securities device(s) described herein).

Figure 6:
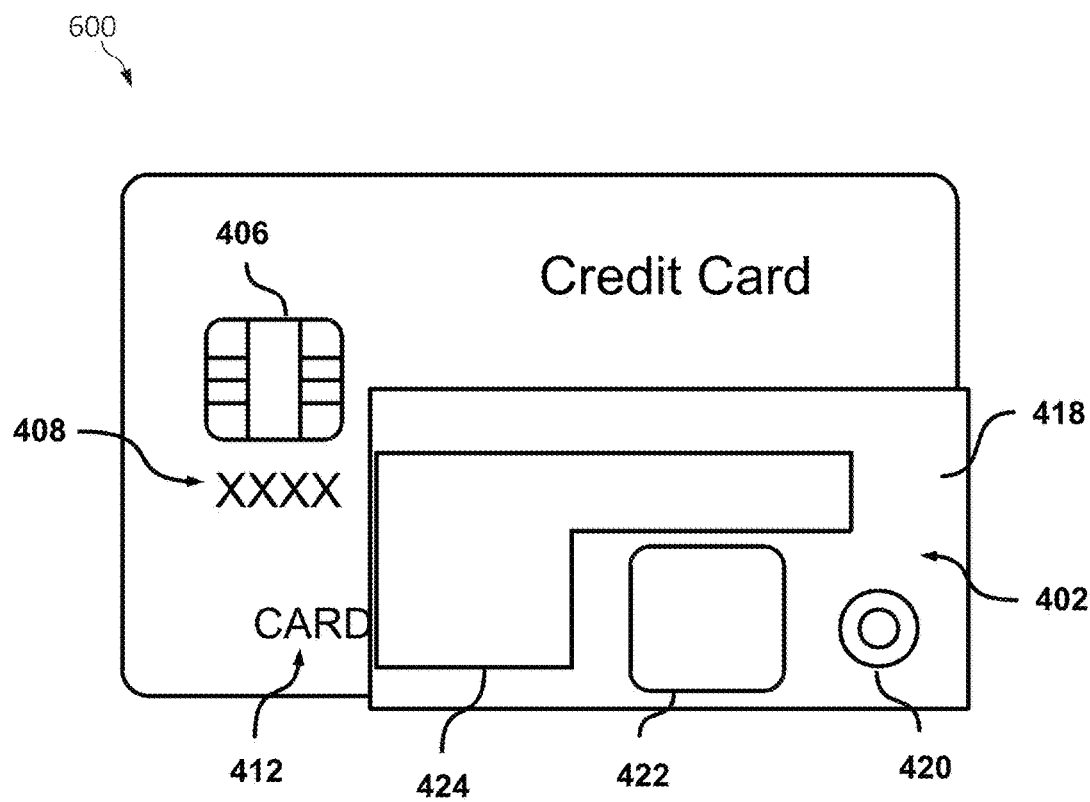
FIG. 6 is a plan view of the front of the personal device of FIG. 4 with a security device attached thereto according to an embodiment of the present invention.
Figure 7:
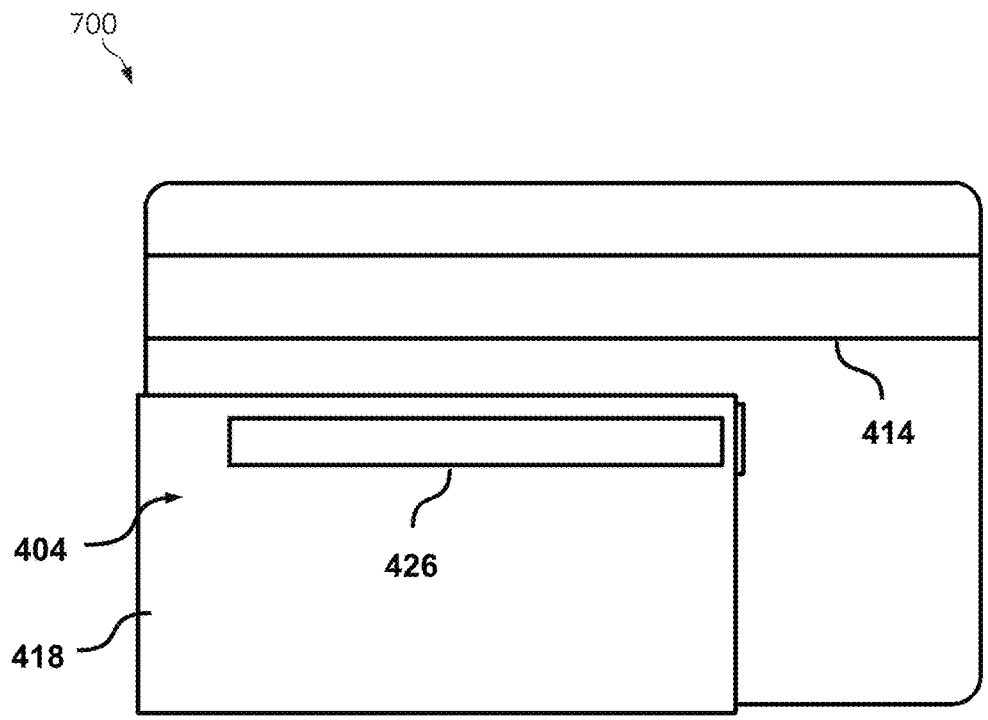
FIG. 7 is a plan view of the back of the personal device of FIG. 6.

FIGS. 6 and 7 illustrate the card 400 with a payment card security device 418 attached (or coupled or connected) thereto. In some embodiments, the security device 418 is a computing device (e.g., similar to a mobile electronic device, wearable technology device, etc.) that includes, for example, a processor configured to cause the security device 418 and/or the components thereof (such as those described below) to perform the functionality described herein, as well as, for example, a wireless communications (e.g., Wi-Fi) transceiver and battery (e.g., chargeable via a smart wallet or port on the security device 418).

In the depicted embodiment, the security device 418 has a general shape similar to that of the card (e.g., rectangular) but is smaller in size. Although not shown in detail, the security device 418 may have a slot formed therein such that the card 400 may be inserted into the security device 418 and/or the security device may be installed onto the card 400. As such, in an embodiment such as that illustrated, the security device 418 includes (at least) a first portion on (or adjacent to) the front 402 of the card 400 and a second portion on the back 404 of the card. Although not shown, the security device 418 may be affixed to the card 400 with, for example, an adhesive or one or more pins that extend through the card 400.

In the depicted embodiment, on the front 402 of the card 400 (i.e., on the first portion of the security device 418), the security device 418 includes a camera 420, a fingerprint scanner 422, and a (first or front) security window 424. The camera 420 may include any suitable electromagnetic sensor suitably configured to capture images and/or record video, such as a micro or nano camera. The fingerprint scanner 422 may include any suitable device for recognizing and/or differentiating fingerprints, as is commonly understood. The fingerprint scanner 422 may include, for example, an optical scanner, capacitive scanner, ultrasonic scanner, and/or a thermal scanner. In some embodiments, the security window 424 may be configured to selectively allow light to be transmitted therethrough. In particular, in the depicted embodiment, the security window 424 is sized, shaped, and positioned such that it covers at least a portion of the card number 408, expiration date 410, and name 412 on the front 402 of the card 400. As shown in FIG. 6, the security window 424 is configured such that light is being blocked, such that the information below (e.g., the last twelve digits of the card number 408) is not visible. In some embodiments, the security window 424 may include an electrochromic device (or panel), as is commonly understood.

Referring now to FIG. 7, in the depicted embodiment, on the back 404 of the card 400 (i.e., on the second portion of the security device 418), the security device 418 includes a (second or back) security window 426. The second security window 426 may be similar to the first security window 424. In the embodiment shown, the second security window 426 is sized, shaped, and positioned such that it covers the signature strip 416 on the back 404 of the card 400. As shown in FIG. 7, the second security window 426 is configured such that light is being blocked, such that the information below (e.g., the signature) is not visible.

The security device 418 may be utilized in various ways to provide increased security for the payment card 400 by, for example, changing the operational state of the payment card (e.g., the visibility of the information on the card, the status of the account associated with the card, etc.). For example, the security device 418 may be configured (e.g., via user preferences, set up, etc.) such that the security windows 424 and 426 do not allow the transmission of light unless particular security measures are taken. In particular, in order for the security windows 424 and 426 to (at least temporarily) allow the information below to be seen, an image may first be taken by the camera 420 and/or a fingerprint scan may be taken by the fingerprint scanner 422. This information (e.g., the image and/or the fingerprint scan) may be transmitted to another computing system for a verification process. In some embodiments, the information may be sent to a centralized server or system where it is compared to information associated with the owner of the payment card. For example, an image captured by the camera 420 of an individual associated with recent activity of the payment card 400 (e.g., an individual near the payment card) may be compared to what is known to be an image of the owner of the card 400. Facial recognition may be utilized to be determine whether or not the individual is the owner (or another authorized user). Similarly, a fingerprint scan taken by the fingerprint scanner 422 may be compared to a fingerprint scan that is known to be that of the owner of the card 400.

Figure 8:
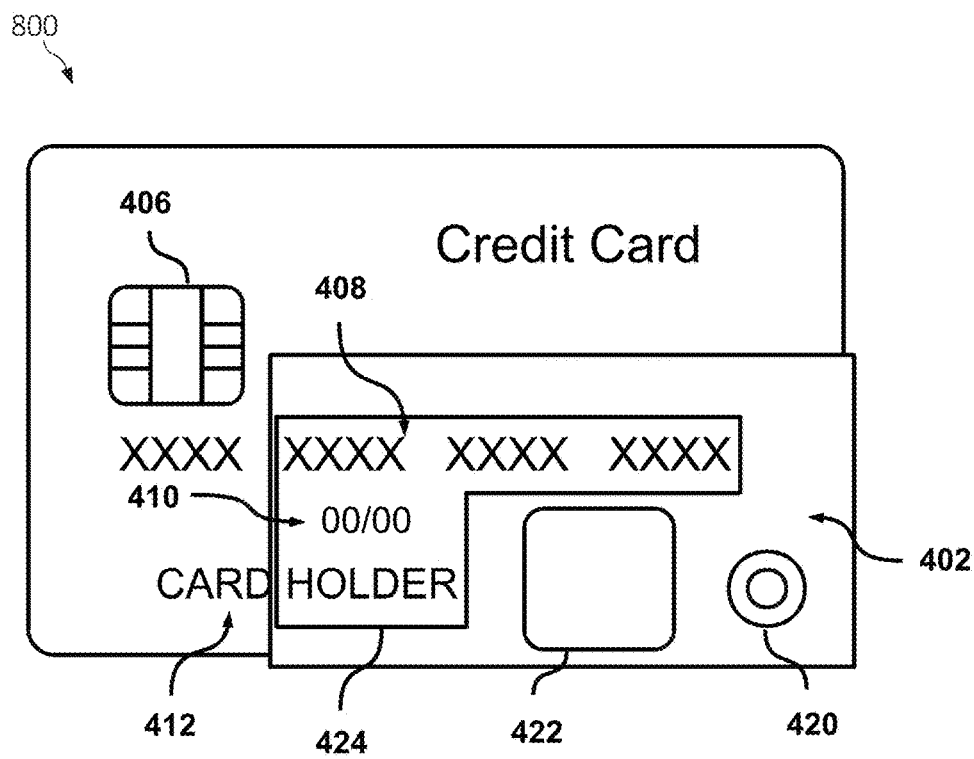
FIG. 8 is a plan view of the front of the personal device of FIG. 6 showing a change in the operational state of the personal device according to an embodiment of the present invention.
Figure 9:
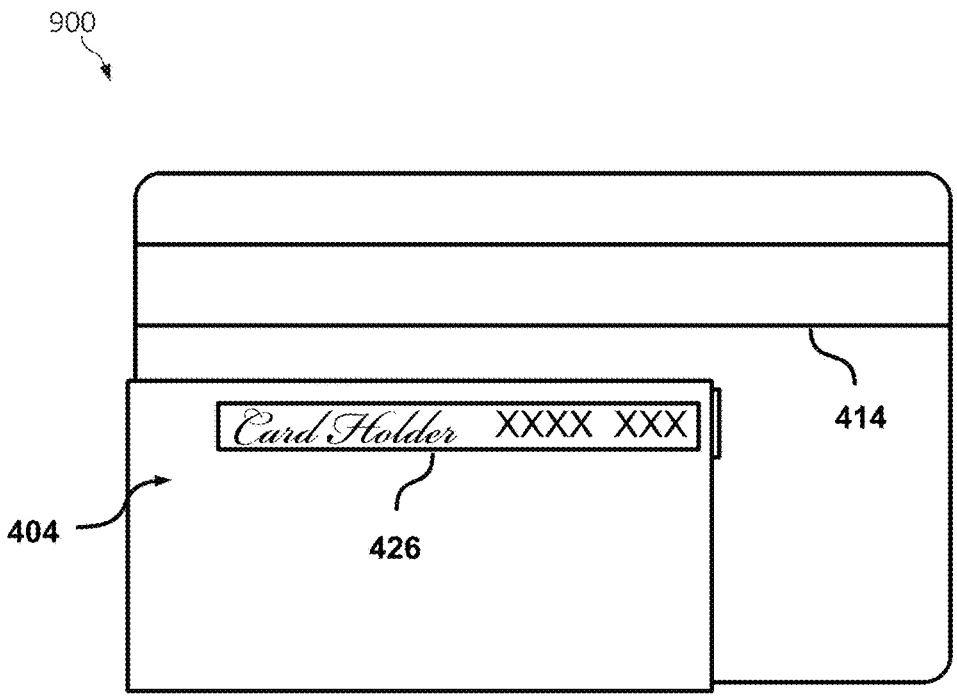
FIG. 9 is a plan view of the back of the personal device of FIG. 8.

If the individual is determined to be the owner, a signal indicative of such may be transmitted to the card 400, which may cause the security windows 424 and 426 to "switch," thus allowing the information below to be seen, as shown in FIGS. 8 and 9. The visibility of the information may allow an individual attempting to "run" or "swipe" the card 400 (e.g., a store clerk, a server at a restaurant, etc.) to verify the name and/or signature of the individual attempting to use the card.

It should be understood that in some embodiments, the security device 418 may (also) affect the status of the account associated with the payment card 400. For example, depending on user preferences, the account may be "frozen" until a person attempting to use the card 400 is determined to be the owner of the card 400 (or another authorized user). For example, if an image taken by the camera 420 and/or a fingerprint scan taken by the fingerprint scanner 422 is used to determine that the individual is the owner, the account may be unlocked or activated for a predetermined amount of time (e.g., five minutes), during which the card 400 may be used to access the account. As such, in some embodiments, the security window(s) may not be utilized and/or included at all.

In some embodiments, again perhaps depending on user preferences, the security device 418 may be used to limit the operation/use of the card 400 in only certain circumstances. For example, the camera 420 may be used to continuously monitor the vicinity of the card 400, and the card 400 and/or the account associated therewith may be (at least temporarily) disabled if the camera captures an image of individual (e.g., relatively close to the card 400) and/or detects that someone has taken a photograph of the card (e.g., via image recognition), the security device 400 may, for example, block the information on the card 400 with the security window(s) (in such embodiments) and/or the account associated with the card 400 may be frozen. In such embodiments, the card 400 (and/or the account) may be changed to back to enabled state only after an appropriate fingerprint scan (e.g., via the fingerprint scanner 422) and/or image verifying the presence of the owner (or authorized user) is detected.

As another example, the security device may be configured to determine the location/position of the card (e.g., via wireless communications, a GPS module, etc.) relative to, for example, a mobile electronic device registered to the owner of the card. In such an embodiment, if it determined that the card is beyond a predetermined range from the owner (e.g., his/her mobile device), such as 20 meters, the security device may deactivate the card and/or the account associated therewith may be frozen until the appropriate confirmation is received (e.g., a fingerprint scan by the owner, an acknowledgement by the owner, etc.).

In some embodiments, the methods and systems described herein detect swipes (and/or reads) of the card (and/or the magnetic stripe) to manage security. Referring again to FIGS. 4-9, in some embodiments, the magnetic stripe 414 includes a line of dipoles (e.g., formed by magnetic particles) that may have switched polarity at specified distances. When the polarity of the dipoles changes, a burst of current is induced, which is the mechanism for data transmission. This mechanism may also be utilized to determine when and/or the speed/frequency at which the magnetic stripe 414 is swiped. In some embodiments, an accelerometer (e.g., a microelectromechanical systems (MEMS) accelerometer) integrated with the security device 418 and/or the card 400, perhaps along with a magnetic sensor (also within the security device 418 and/or the card 400), may be used to detect swipes. Further, in embodiments in which the card 400 includes a chip (e.g., chip 406), usage of the chip may indicate that the card 400 is being used (or read).

In some embodiments, when the use (or attempted use) of the card is detected (e.g., via a detected swipe or read) multiple times in a short period of time (e.g., two or more swipes within a matter of a few seconds), an image may be captured by the camera 420 and/or any fingerprint scan detected by the fingerprint scanner 422 (e.g., even one captured without the user being made aware of it) may be sent to another computer system. For example, as described above, the image and/or fingerprint (or a notification thereof) may be sent to a centralized system to be compared to stored data associated with the owner of the card. As another example, the information may be sent to a computing device (e.g., a mobile phone, smart wallet, etc.) associated with the owner, providing an alert of the card activity. The owner may then be able to provide an indication (e.g., via an application, email, text message, etc.) as to whether or not any action should be taken with respect to the operational state of the card (e.g., disable/deactivate/freeze/lock the card/account, allow the card to be used, etc.).

In some embodiments, the notification is forwarded to a central server to, for example, avoid false positives, perhaps utilizing a cognitive system. For example, the server may aggregate data to see how often incidents have been detected at a given location, decide whether fraudulent activity is occurring, and notify affected card owners, perhaps even retroactively (e.g., hours or days after the initial notification). By comparing the user data attached to the notification, the server may also attempt to uncover the perpetrator's identity.

In some embodiments, the central server may be in operable communication with the computing systems associated with the organizations who administer the account (e.g., banks), which may provide notifications when fraudulent activity has been reported on a given card to, for example, help determine the source and the ramifications of the fraud. For example, if a particular card is reported stolen, and the system notices that it was swiped twice at the same location several days ago, the system may conclude that all the other notifications coming from that location are true positives and notify other users. If possible, information may be sent back regarding the likely identity of the perpetrator.

Figure 10:
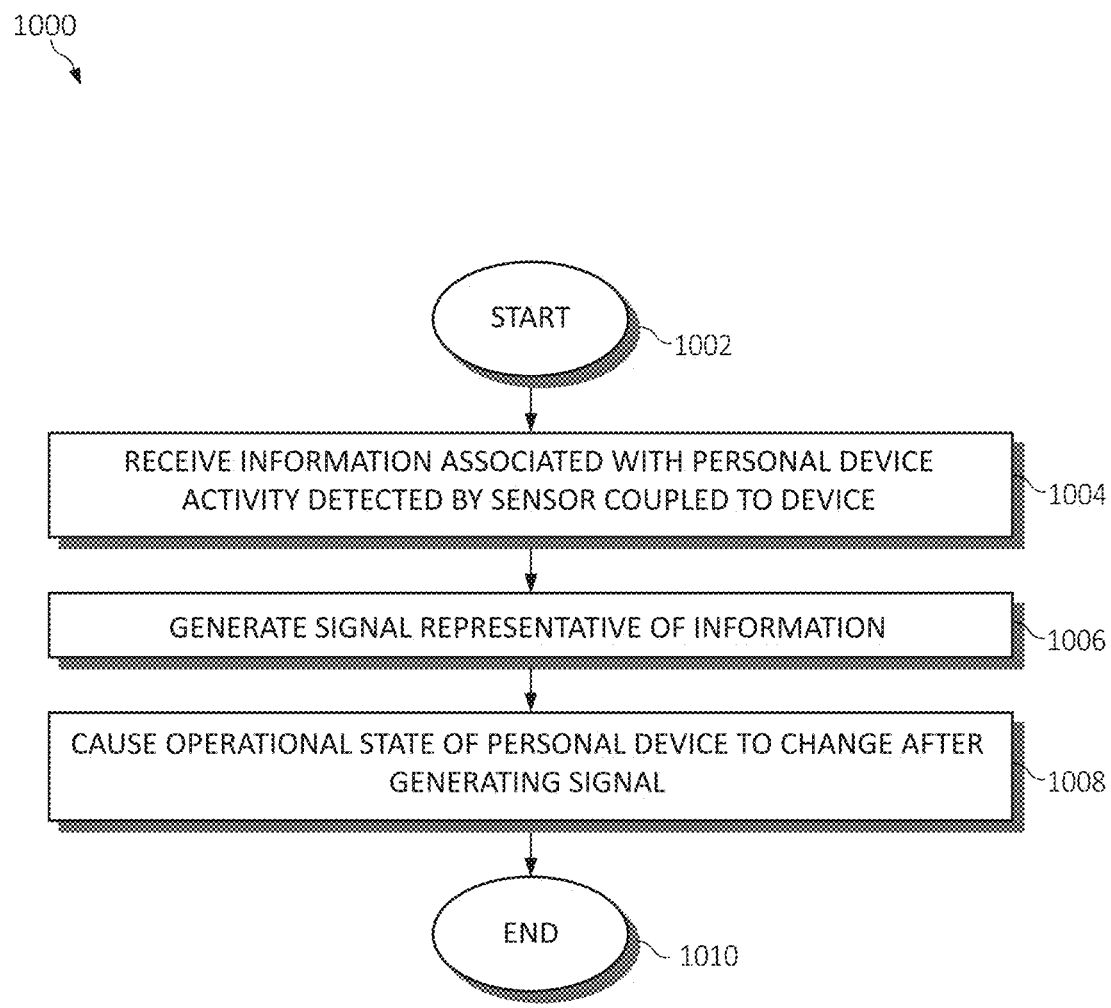
FIG. 10 is a flowchart diagram of an exemplary method for personal device security according to an embodiment of the present invention.

Turning to FIG. 10, a flowchart diagram of an exemplary method 1000 for managing personal device security is illustrated. Method 1000 begins (step 1002) with, for example, a security device (e.g., those described above) being coupled or attached to a personal device, such as a magnetic stripe card, such as a payment card (e.g., a credit card, debit card, etc.), computing device, fob, appliance, etc. However, in some embodiments, the personal device security functionality described herein is integrated into the personal device itself.

Information associated with activity of the personal device is received (step 1004). In some embodiments, the information is detected utilizing a sensor coupled to the personal device (e.g., on the security device or integrated within the payment card). The sensor may be attached to an exterior of the personal device. The sensor may include, for example, a camera, a fingerprint scanner, or a combination thereof. In embodiments in which the sensor includes a camera, the received information may include an image of an individual associated with the activity of the personal device captured by the camera (e.g., a photograph of an individual near the personal device). In embodiments in which the sensor includes a fingerprint scanner, the received information may include a fingerprint scan of an individual associated with the activity of the personal device detected by the fingerprint scanner.

A signal representative of the received information is generated (step 1006). In some embodiments, the generation of the signal may include comparing the received information to stored information associated with an owner (or authorized user) of the personal device. In some embodiments, the generation of the signal may include providing a notification to an owner of the personal device (e.g., via email, text message, etc. on a mobile device).

An operational state of the personal device is caused to be changed after the generating of the signal (step 1008). The changing of the operational state of the personal device may include, for example, causing information on the personal device that is hidden or concealed by the security device to become visible and/or changing the status of an account associated with the personal device (e.g., freezing the account, unlocking the account, etc.). The causing of the operational state of the personal device to be changed may be based on the comparison of the received information to the stored information (i.e., associated with the owner of the personal device). In embodiments in which a notification is sent to the owner of the personal device, an indication from the owner in response to the notification may be received (e.g., via an application, email, etc.). The causing of the operational state of the personal device to be changed may be based on the received indication.

Method 1000 ends (step 1010) with, for example, the personal device being used or prevented from being used, as described above. Method 1000 may be reinitiated with the detection of a new set of information by the sensor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a computing device having one or more processors, for managing personal device security comprising:

physically coupling the computing device having at least one integrated sensor to an exterior of a magnetic stripe card having financial account data of a user to which the magnetic stripe card belongs permanently and physically embedded thereon, wherein, subsequent to physically coupling the computing device to the exterior of the magnetic stripe card, the computing device monitors in-person transactions initiated between the magnetic stripe card and a second computing device operated by a merchant;

detecting, by the computing device, that the financial account data stored on at least one of a chip and a magnetic stripe of the magnetic stripe card has been at least attempted to be read more than a predetermined number of times comprising at least a plurality of times within a predefined interval of time at a singular location, such that the attempted reads indicate potential malicious activity, wherein the detecting is performed using the at least one integrated sensor;

responsive to the detecting, receiving, by the computing device, information identifying whether the user is currently physically in possession of the magnetic stripe card from the at least one integrated sensor and associated with activity of the magnetic stripe card during the at least attempted reading;

transmitting, by the computing device via a network, the received information to a third computing device;

comparing, by the third computing device, the received information against stored information; and changing an operational state of the magnetic stripe card according to a response received by the computing device from the third computing device based upon the comparison.

2. The method of claim 1, wherein the at least one integrated sensor includes at least one of a camera and a fingerprint scanner.

3. The method of claim 1, wherein the at least one integrated sensor includes a camera, and the received information includes an image of an individual associated with the activity of the magnetic stripe card captured by the camera.

4. The method of claim 1, wherein the at least one integrated sensor includes a fingerprint scanner, and the received information includes a fingerprint scan of an individual associated with the activity of the magnetic stripe card detected by the fingerprint scanner.

5. The method of claim 1, wherein the comparing of the received information to the stored information includes determining whether the activity is associated with an authorized user of the magnetic stripe card.

6. The method of claim 1, wherein, based upon the comparison, a notification is provided to an owner of the magnetic stripe card, further comprising receiving an indication from the owner of the magnetic stripe card in response to the notification, and wherein the changing of the operational state of the magnetic stripe card is based on the received indication.

7. A system for managing personal device security comprising:

a magnetic stripe card having financial account data of a user to which the magnetic stripe card belongs permanently and physically embedded thereon;

a computing device physically coupled to an exterior of the magnetic stripe card, the computing device inclusive of at least one integrated sensor, wherein, subsequent to physically coupling the computing device to the exterior of the magnetic stripe card, the computing device monitors in-person transactions initiated between the magnetic stripe card and a second computing device operated by a merchant;

a third computing device in communication with the computing device via a network; and at least one processor integrated into the computing device that:

detects that the financial account data stored on at least one of a chip and a magnetic stripe of the magnetic stripe card has been at least attempted to be read more than a predetermined number of times comprising at least a plurality of times within a predefined interval of time at a singular location, such that the attempted reads indicate potential malicious activity, wherein the detecting is performed using the at least one integrated sensor;

responsive to the detecting, receives information identifying whether the user is currently physically in possession of the magnetic stripe card from the at least one integrated sensor and associated with activity of the magnetic stripe card during the at least attempted reading;

transmits, by the computing device via the network, the received information to the third computing device;

compares, by the third computing device, the received information against stored information; and changes an operational state of the magnetic stripe card according to a response received by the computing device from the third computing device based upon the comparison.

8. The system of claim 7, wherein the at least one integrated sensor includes at least one of a camera and a fingerprint scanner.

9. The system of claim 7, wherein the at least one integrated sensor includes a camera, and the received information includes an image of an individual associated with the activity of the magnetic stripe card captured by the camera.

10. The system of claim 7, wherein the at least one integrated sensor includes a fingerprint scanner, and the received information includes a fingerprint scan of an individual associated with the activity of the magnetic stripe card detected by the fingerprint scanner.

11. The system of claim 7, wherein the comparing of the received information to the stored information includes determining whether the activity is associated with an authorized user of the magnetic stripe card.

12. The system of claim 7, wherein, based upon the comparison, a notification is provided to an owner of the magnetic stripe card, further comprising receiving an indication from the owner of the magnetic stripe card in response to the notification, and wherein the changing of the operational state of the magnetic stripe card is based on the received indication.

13. A computer program product for managing personal device security by a computing device having one or more processors, the computer program product comprising a non-transitory computer-readable storage medium having computer-readable program code portions stored therein, the computer-readable program code portions comprising:

an executable portion that detects, by the computing device, that financial account data of a user stored on at least one of a chip and a magnetic stripe of a magnetic stripe card, of which the computing device is physically coupled to an exterior of to monitor in-person transactions initiated between the magnetic stripe card and a second computing device operated by a merchant, has been at least attempted to be read more than a predetermined number of times comprising a plurality of times within a predefined interval of time at a singular location, such that the attempted reads indicate potential malicious activity, wherein the detecting is performed using the at least one integrated sensor;

an executable portion that, responsive to the detecting, receives, by the computing device, information identifying whether the user is currently physically in possession of the magnetic stripe card from the at least one integrated sensor and associated with activity of the magnetic stripe card during the at least attempted reading;

an executable portion that transmits, by the computing device via a network, the received information to a third computing device;

an executable portion that compares, by the third computing device, the received information against stored information; and an executable portion that changes an operational state of the magnetic stripe card according to a response received by the computing device from the third computing device based upon the comparison.

14. The computer program product of claim 13, wherein the at least one integrated sensor includes at least one of a camera and a fingerprint scanner.

15. The computer program product of claim 13, wherein the at least one integrated sensor includes a camera, and the received information includes an image of an individual associated with the activity of the magnetic stripe card captured by the camera.

16. The computer program product of claim 13, wherein the at least one integrated sensor includes a fingerprint scanner, and the received information includes a fingerprint scan of an individual associated with the activity of the magnetic stripe card detected by the fingerprint scanner.

17. The computer program product of claim 13, wherein the comparing of the received information to the stored information includes determining whether the activity is associated with an authorized user of the magnetic stripe card.

18. The computer program product of claim 13, wherein, based upon the comparison, a notification is provided to an owner of the magnetic stripe card, further comprising receiving an indication from the owner of the magnetic stripe card in response to the notification, and wherein the changing of the operational state of the magnetic stripe card is based on the received indication.

\* \* \* \* \*